(12) United States Patent
Saito et al.

(10) Patent No.: US 10,855,837 B2
(45) Date of Patent: Dec. 1, 2020

(54) CALL RECORDING SYSTEM AND METHOD OF REPRODUCING RECORDED CALL

(71) Applicant: Hitachi Information & Telecommunication Engineering, Ltd., Kanagawa (JP)

(72) Inventors: Terumi Saito, Nakai-machi (JP); Takashi Sugiyama, Nakai-machi (JP)

(73) Assignee: HITACHI INFORMATION & TELECOMMUNICATION ENGINEERING, LTD., Kanagawa (JP)

( * ) Notice: Subject to any disclaimer, the term of this patent is extended or adjusted under 35 U.S.C. 154(b) by 4 days.

(21) Appl. No.: 16/181,391

(22) Filed: Nov. 6, 2018

(65) Prior Publication Data

US 2019/0306310 A1 Oct. 3, 2019

(30) Foreign Application Priority Data

Mar. 27, 2018 (JP) .................................. 2018-059422

(51) Int. Cl.
*H04M 3/00* (2006.01)
*H04M 3/42* (2006.01)
*G10L 15/28* (2013.01)

(52) U.S. Cl.
CPC ......... *H04M 3/42221* (2013.01); *G10L 15/28* (2013.01); *H04M 2203/301* (2013.01)

(58) Field of Classification Search
CPC ........................ H04M 3/436; G06F 17/30613
USPC ............ 379/210.02, 215.01, 114.14, 210.03, 379/142.01, 142.05, 142.06
See application file for complete search history.

(56) References Cited

FOREIGN PATENT DOCUMENTS

JP 2017-169037 A 9/2017

*Primary Examiner* — William J Deane, Jr.
(74) *Attorney, Agent, or Firm* — Mattingly & Malur, PC

(57) ABSTRACT

The sections of the call unnecessary for reproduction are grasped without wasting time and labor. The call recording system includes a call information entry unit to enter operation information of call terminals which is acquired by a call control unit into a terminal operation information table; a recorded information entry unit to enter recorded information of the call which are acquired by a call recording unit into a recorded information table; and a call information reproduction unit to recognize sections unnecessary for reproduction of the recorded information based on the operation information of the call terminals so as to display a reproduction screen including a result on the recognized sections on a display section.

8 Claims, 7 Drawing Sheets

F I G. 1
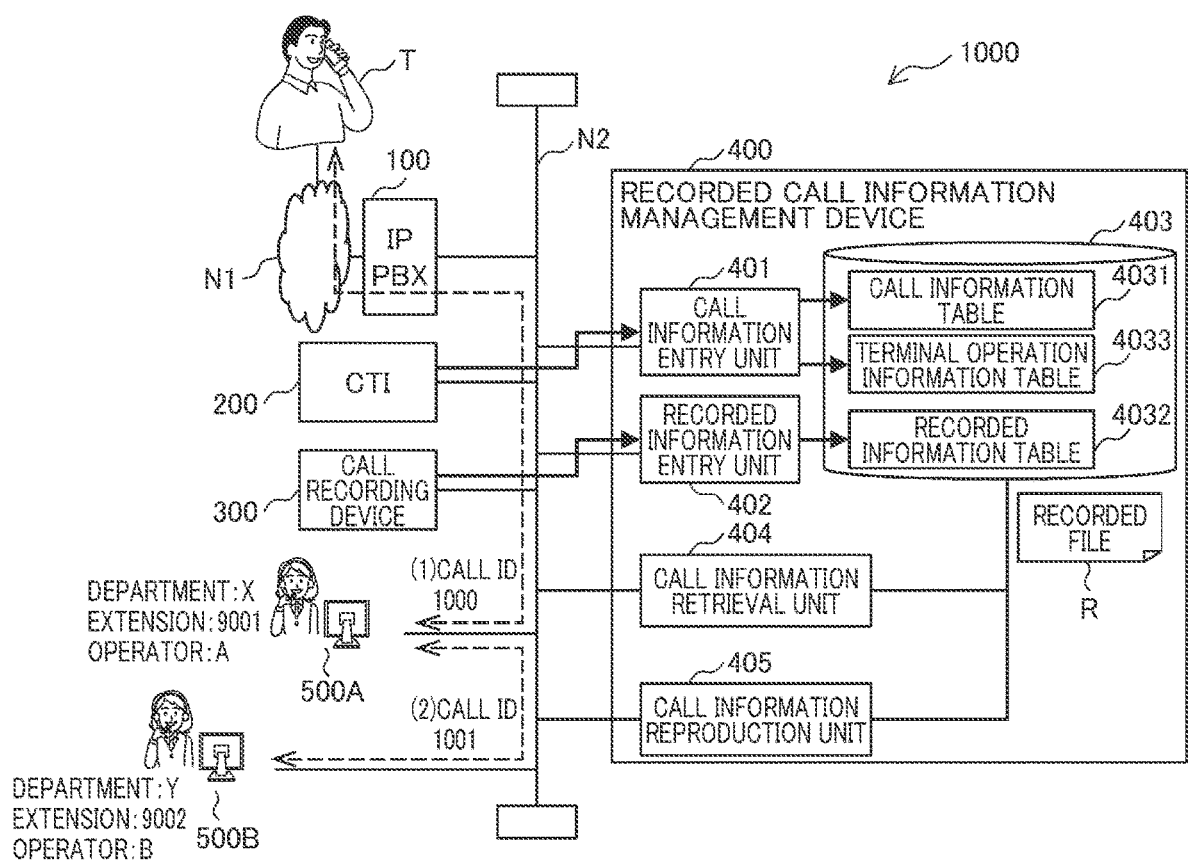

| CALL ID | DATE AND TIME WHEN CALL STARTS | DATE AND TIME WHEN CALL ENDS | CALLED PARTY TELEPHONE NUMBER | EXTENSION | OPERATOR ID | DEPART-MENT |
|---|---|---|---|---|---|---|
| 1000 | 2017/12/24 10:00:00 | 2017/12/24 10:10:00 | 0901122XXXX | 9001 | A | X |
| 1001 | 2017/12/24 10:05:00 | 2017/12/24 10:06:00 | 9001 | 9002 | B | Y |
| 1002 | ... | ... | ... | | | ... |

| DATE AND TIME WHEN RECORDING STARTS | DATE AND TIME WHEN RECORDING ENDS | CALL ID | RECEIVING RECORDING FILE PATH | TRANSMITTING PARTY RECORDING FILE PATH |
|---|---|---|---|---|
| 2017/12/24 10:00:01 | 2017/12/24 10:10:00 | 1000 | E:¥Voice¥xxx1-1.wav | E:¥Voice¥xxx1-2.wav |
| 2017/12/24 10:05:00 | 2017/12/24 10:06:00 | 1001 | E:¥Voice¥xxx2-1.wav | E:¥Voice¥xxx2-2.wav |
| ... | ... | ... | ... | ... |

| CALL ID | EXTENSION | OPERATION DETAIL | TIME OF THE DAY FOR OPERATION |
|---|---|---|---|
| 1000 | 9001 | START | 10:00:00 |
| 1000 | 9001 | HOLD | 10:01:00 |
| 1000 | 9001 | RESUME | 10:01:20 |
| 1000 | 9001 | HOLD | 10:05:00 |
| 1000 | 9001 | RESUME | 10:06:00 |
| 1000 | 9001 | HOLD | 10:08:00 |
| 1000 | 9001 | RESUME | 10:08:30 |
| 1000 | 9001 | END | 10:10:00 |
| 1000 | 9002 | START | 10:05:00 |
| 1000 | 9002 | END | 10:06:00 |
| ... | ... | ... | ... |

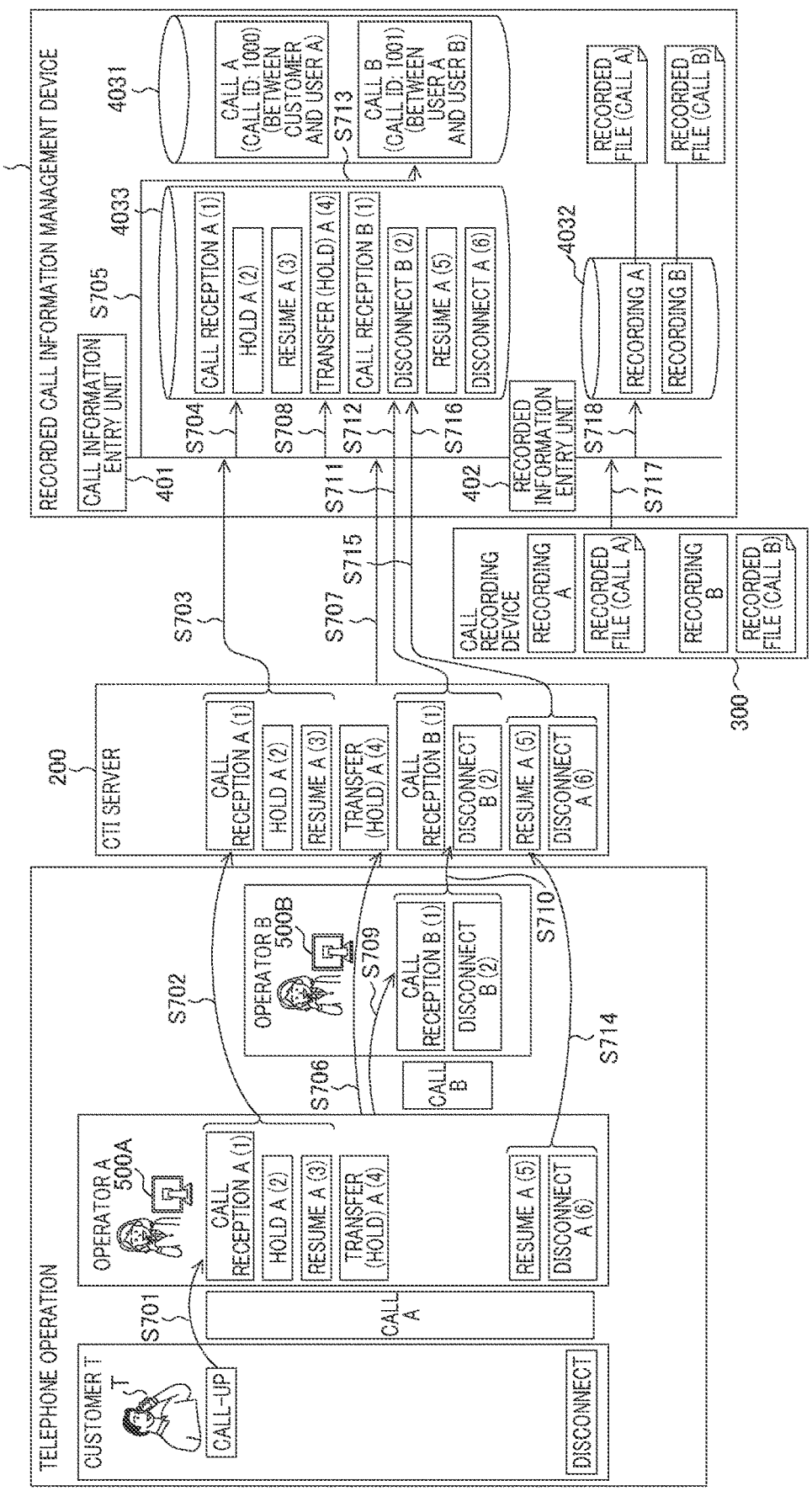
F I G. 7

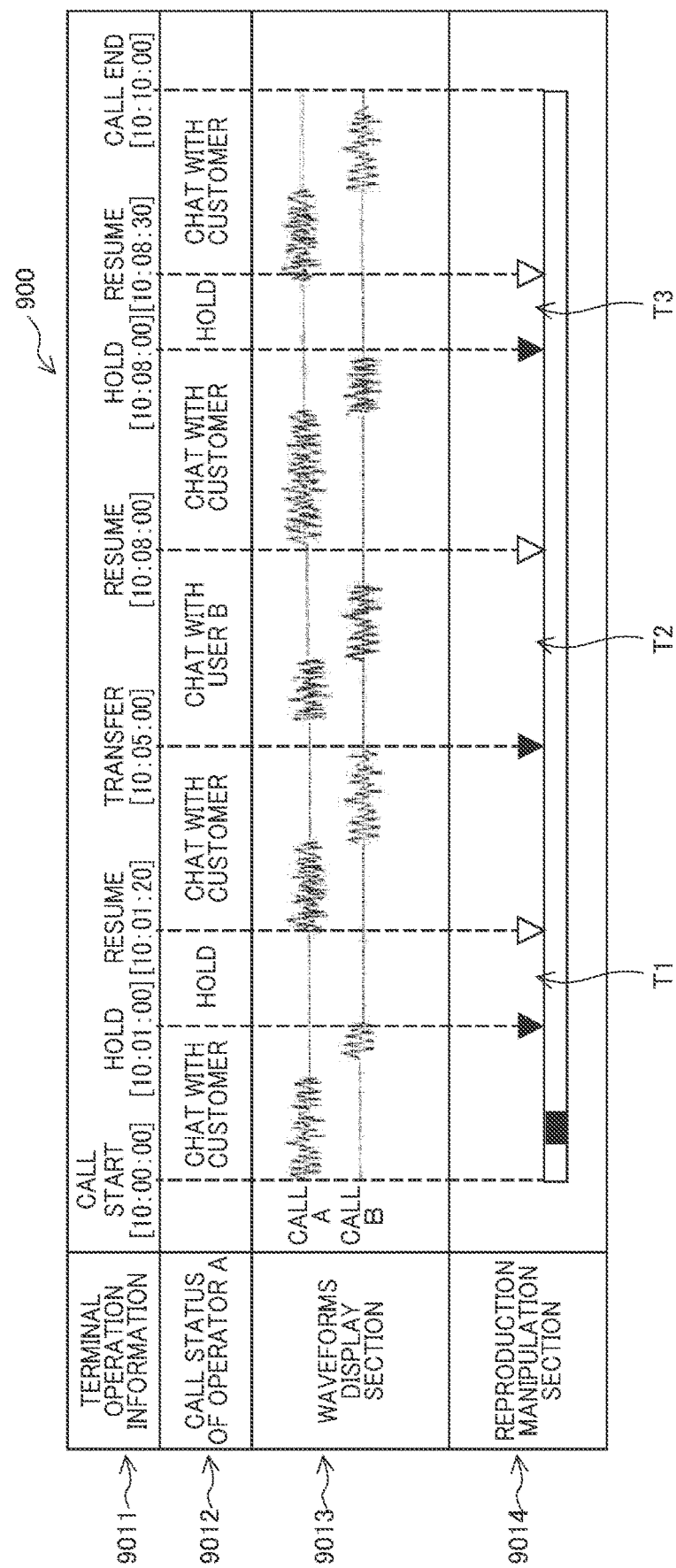

CALL RECORDING SYSTEM AND METHOD OF REPRODUCING RECORDED CALL

CLAIM OF PRIORITY

The present application claims priority from Japanese application serial no. JP2018-059422, filed on Mar. 27, 2018, the content of which is hereby incorporated by reference into this application.

BACKGROUND

The present invention relates to a call recording system and a method of reproducing a recorded call.

Conventionally, various types of techniques are known for recording a call between a customer and an operator at the call center. For instance, according to the disclosure of Patent Literature 1, the liaison with the voice recognition system is carried out by deleting voice corresponding to the sections of the recorded information which are unnecessary for voice recognition processing based on such call events as 'call start' and 'call end'.

According to the disclosure of Japanese Unexamined Patent Application Publication No. 2017-169037, the audio content corresponding to the sections of the recorded information that do not require voice recognition processing are subjected to deletion, but since such deletion is not carried out upon reproduction, the voices corresponding to the sections of the recorded information which is unnecessary for reproduction (e.g. intervening guidance sounds upon the call being held) result in being reproduced as they are. Accordingly, the operator or the administrator has to judge the sections of the recorded file which are unnecessary for reproduction by e.g. visually observing voice waveforms displayed on the screen upon the recorded file being reproduced. In this case, because the sections of the recorded file which are judged by the visual observation as unnecessary for reproduction do not necessarily correspond to those actually unnecessary for reproduction, it requires that the sections of the recorded file to be reproduced be adjusted, which takes a lot of time and labor.

SUMMARY OF THE INVENTION

The present invention is to provide a call recording system and a method of reproducing a recorded call which allow the sections of the recorded information which is unnecessary for reproduction to be grasped without wasting time and labor.

The call recording system according to the present invention operates in connection with a call center having, for example, an Internet Protocol-Private Branch eXchange, a Computer Telephony Integration (CTI) server; a call recording device; and a recorded call information management device. Operator terminals are connected to receive calls from customer call terminals through the IP-PBX device which is interconnected with a public network. The IP-PBX device, the CTI server, the call recording device, the recorded call information management device and the operator terminals are interconnected with an IP line network within the premise of the call center. A call information entry unit enters operation information of the call terminals which are acquired by the call control unit into a terminal operation information table; and a recorded information entry unit enters recorded information of the call, which is acquired by the call recording unit into a recorded information table. A call information reproduction unit recognizes sections of the recorded information which are unnecessary for reproduction based on the operation information of the call terminals; and display of a reproduction screen including a result of the recognized sections is shown on a display.

Further, the present invention also covers a method of reproducing a recorded call executed by the call recording system.

The present invention allows the sections of the recorded information which are unnecessary for reproduction to be grasped without wasting time and labor.

BRIEF DESCRIPTION OF THE DRAWINGS

FIG. 1 is a view exemplifying the facility arrangement of a call center;

FIG. 2 is a view exemplifying the call information table;

FIG. 3 is a view exemplifying the recorded information table;

FIG. 4 is a view exemplifying the terminal operation information table;

FIG. 7 is a sequence diagram exemplifying the operations of the present system upon recording;

FIG. 9 is a view illustrating the detailed parts of the call information reproduction screen illustrated in FIG. 6.

DETAILED DESCRIPTION OF THE PREFERRED EMBODIMENTS

Figure 5:
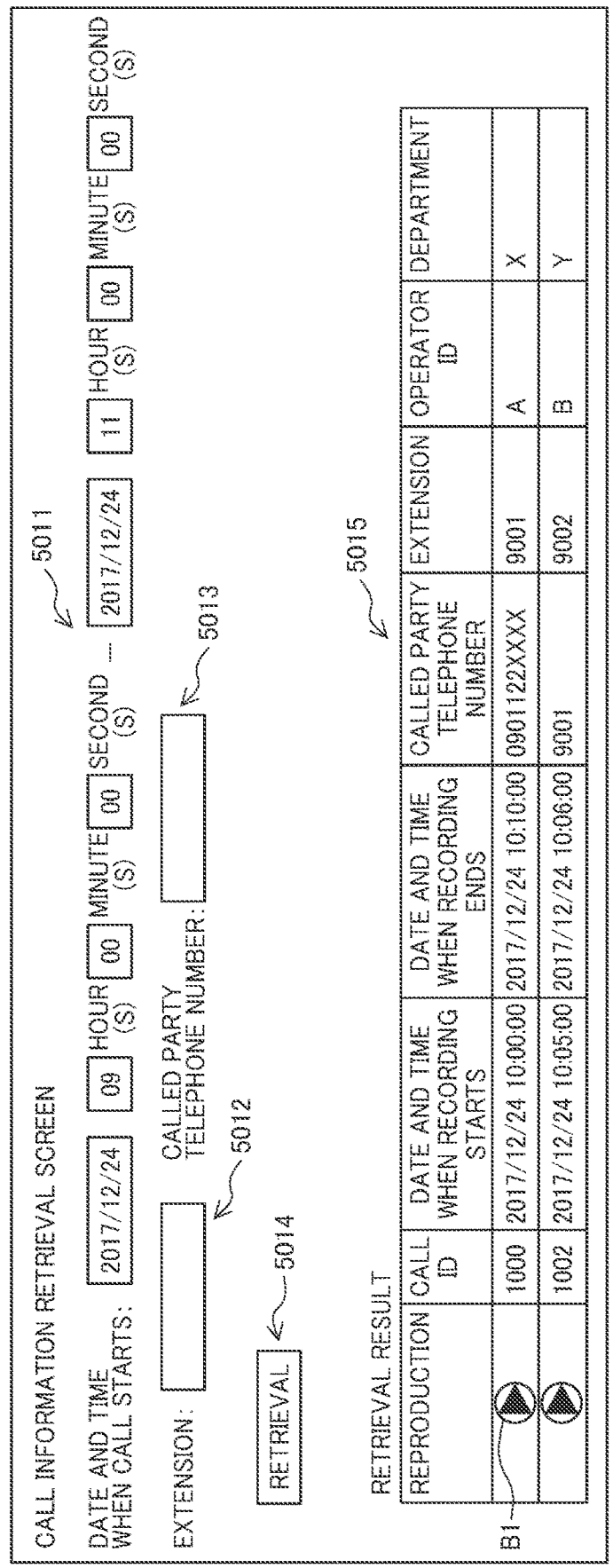
FIG. 5 is a view exemplifying the call information retrieval screen displayed on the operator's terminal.

A preferred embodiment of the call recording system and the method of reproducing a recorded call according to the present invention is explained with reference to the accompanying drawings.

FIG. 1 is a view exemplifying the facility arrangement of the call center in which the call recording system embodied herein is employed. As illustrated in FIG. 1, the call center 1000 is arranged with an Internet Protocol-Private Branch eXchange or in-premise exchanger corresponding to IP line (IP-PBX) device 100; a Computer Telephony Integration (CTI) server 200; a call recording device 300; a recorded call information management device 400; and operator terminals 500 (500A, 500B) which are terminals for the operators to receive a call. A customer's call terminal T and the IP-PBX device 100 are interconnected with a public network N1; and the IP-PBX device 100, the CTI server 200, the call recording device 300, the recorded call information management device 400 and the operator terminals 500 (500A, 500B) are interconnected with an IP line network N2 within the premise of the call center 1000.

The IP-PBX device 100 is a general computer provided with e.g. a central processing unit (CPU) and memories in terms of hardware and is configured to carry out such operations as protocol conversion between the IP network and the public network N1 and call control of incoming and outgoing call upon the reception of the call from the customer's call terminal T.

The CTI server (call control server) 200 is a general computer in terms of hardware in the same way as the IP-PBX device 100 and is configured to carry out the call control for the operator terminals 500. The CTI server 200 manages the call center 1000 as a whole and carries out such operations as transmitting the call received from the IP-PBX device 100 to the operator terminals 500 and giving a necessary instruction to the recorded call information management device 400 when the call state is in connection (or in communication). Further, for calls between the customer and the operator or between the operators, the CTI server 200 acquires information on the call (call information) such as the attributes of the call including call voices (audio) between the call terminal T and the operator terminals 500 (500A, 500B), and between the operator terminals and the terminal operation information, so as to output such information to the recorded call information management device 400.

The call recording device 300 is a general computer in terms of hardware in the same way as e.g. the IP-PBX device 100 and is configured to record the call voices between the call terminal T and the operator terminals 500 (500A, 500B) and between the operator terminals. Further, the call recording device 300 outputs information on recording (recorded information) such as the attributes of recordings including recorded files in which the call voices are recorded and the recorded information of the call voices to the recorded call information management device 400.

The recorded call information management device 400 is a general computer in terms of hardware in the same way as e.g. the IP-PBX device 100 and is configured to manage the call between the customer and the operator. The concrete arrangement of the recorded call information management device 400 is described later in detail.

The operator terminal 500 is a general computer in terms of hardware in the same way as e.g. a PC (Personal Computer); is a terminal operated by the operator or administrator of the call center 1000; and has telephonic functions. The operator terminal 500 responds to the call received from the IP-PBX device 100 in accordance with the instruction from the CTI server 200, in which the operator makes communication with the customer's call terminal T through an outside line or the public network N1. An input device such as a keyboard and a mouse and a display device such as a liquid crystal display (LCD) are connected to the operator terminal 500.

As illustrated in FIG. 1, the recorded call information management device 400 includes a call information entry unit 401, a recorded information entry unit 402, a storage unit 403, a call information retrieval unit 404 and a call information reproduction unit 405. Terminal operation information and call information of the call terminal T and the operator terminals 500, as received from the CTI server 200, is entered into a call information table 4031 of the storage unit 403. Recorded information received from the call recording device 300 (e.g. a recording start time of the day, a recording end time of the day and a stored destination of recorded file) is entered into a recorded information table 4032 of the storage unit 403 by a recorded information entry unit 402. A call information retrieval unit 404 retrieves the entered call information and generates a call information retrieval screen; and a call information reproduction unit 405 reproduces the recorded files.

The storage unit 403 is composed of a storage device such as a hard disk drive (HDD) and stores the call information table 4031 generated from call information received from the CTI server 200 and the recorded information table 4032. The storage unit 403 also stores a terminal operation information table 4033 generated from the terminal operation information included in the call information (e.g. details for which operator terminal is operated and the time of the day when the operator terminal is operated during communication).

The recorded call information management device 400 is composed of a general computer in terms of hardware. In the present embodiment, explanation is given on the premise that the recorded call information management device 400 is single in number, but the respective units above may be realized with a plurality of management devices according to the actual environments in practice. The concrete operations of the recorded call information management device 400 are described later employing the sequence diagram.

FIG. 2 is a view exemplifying the call information table 4031. As illustrated in FIG. 2, in the call information table 4031, a call ID to identify the call between the call terminal T and the operator terminal 500, a call start date and time when the call identified with the call ID starts, a call end date and time when the call identified with the call ID ends, a called party telephone number which is identification information on the calling customer's terminal T, an extension number which is identification information on the called operator terminal 500, an operator ID to identify an operator to which the extension number is designated and a department to which the operator identified with the operator ID belongs are stored correspondingly to one another.

It is illustrated in FIG. 2 by way of one example that the call identified with the call ID '1000' starts just at 10 a.m. and ends at 10 past 10 a.m. on Dec. 24, 2017. It is also illustrated that the call at that time corresponds to the communication made between the called party telephone number '0901122XXXX' and the extension number '9001' designated to an operator A who belongs to an X department.

FIG. 3 shows an example of information stored in the recorded information table 4032. As illustrated in FIG. 3, the recorded information table 4032 includes a recording start date and time when the recording of a call identified with the indicated call ID starts, a recording end date and time when the recording of the call identified with the call ID ends, the above-mentioned call ID, a receiving party recording file path to indicate the path of storing of the file in which the recording content of the receiving party is recorded and a transmitting party recording file path to indicate the path of storing of the file in which the recording content of the transmitting party is recorded. Although it is not specifically illustrated in FIG. 3, the data of the recorded files, indicated with the above paths, are stored.

It is illustrated in FIG. 3 by way of one example that the recording of the call identified with the call ID '1000' starts at one second past 10 a.m. and ends at 10 past 10 a.m. on Dec. 24, 2017. Further, as regards the recorded files at that time, it is illustrated that that of the receiving party is recorded as '¥Voice¥xxx1-1. wav' in E drive of the recorded call information management device 400 while that of the transmitting party is recorded as '¥Voice¥xxx1-2. wav' in E drive of the recorded call information management device 400.

FIG. 4 is a view exemplifying the terminal operation information table 4033. As illustrated in FIG. 4, in the terminal operation information table 4033, the above call ID, the above extension number, details operated by the called operator through the extension number and the time of the day when such details are operated are stored correspondingly to one another.

It is illustrated in FIG. 4 by way of one example that according to the call identified with the call ID '1000', the called operator (an operator A belonging to an X department) through the extension number '9001' holds a receiver and starts receiving the call just at 10 a.m.; holds the call at one minute past 10 a.m. with e.g. a hold button pushed down; and resumes the call at one minute twenty seconds past 10 a.m. with e.g. the hold button pushed down once again.

FIG. 5 is a view exemplifying the call information retrieval screen displayed on the operator terminal. As illustrated in FIG. 5, as the retrieval conditions, an input column 5011 for the date and time when the call starts, an input column 5012 for the above extension number and an input column 5013 for the called party telephone number are displayed in the call information retrieval screen 501. Further, a retrieval button 5014 to retrieve call information using the retrieval conditions inputted from the above columns respectively as keys is displayed in the call information retrieval screen 501. The retrieval button is pushed down, thereby, call information corresponding to the retrieval conditions and originating from the call information table 4031 illustrated in FIG. 2 being displayed as a retrieval result 5015.

It is illustrated in FIG. 5 that two pieces of call information which have started from 9 a.m. till 11 a.m. on Dec. 24, 2017 are retrieved, one of which corresponds to the call which is identified with the call ID '1000' which has started sharp at 10 a.m. on Dec. 24, 2017 (see the illustration of FIG. 2). Further, a reproduction button B1 to reproduce the call is correspondingly displayed in the call information expressed as the above retrieval result 5015. A call information reproduction screen illustrated in FIG. 6 is displayed by the reproduction button being pushed down.

Figure 6:
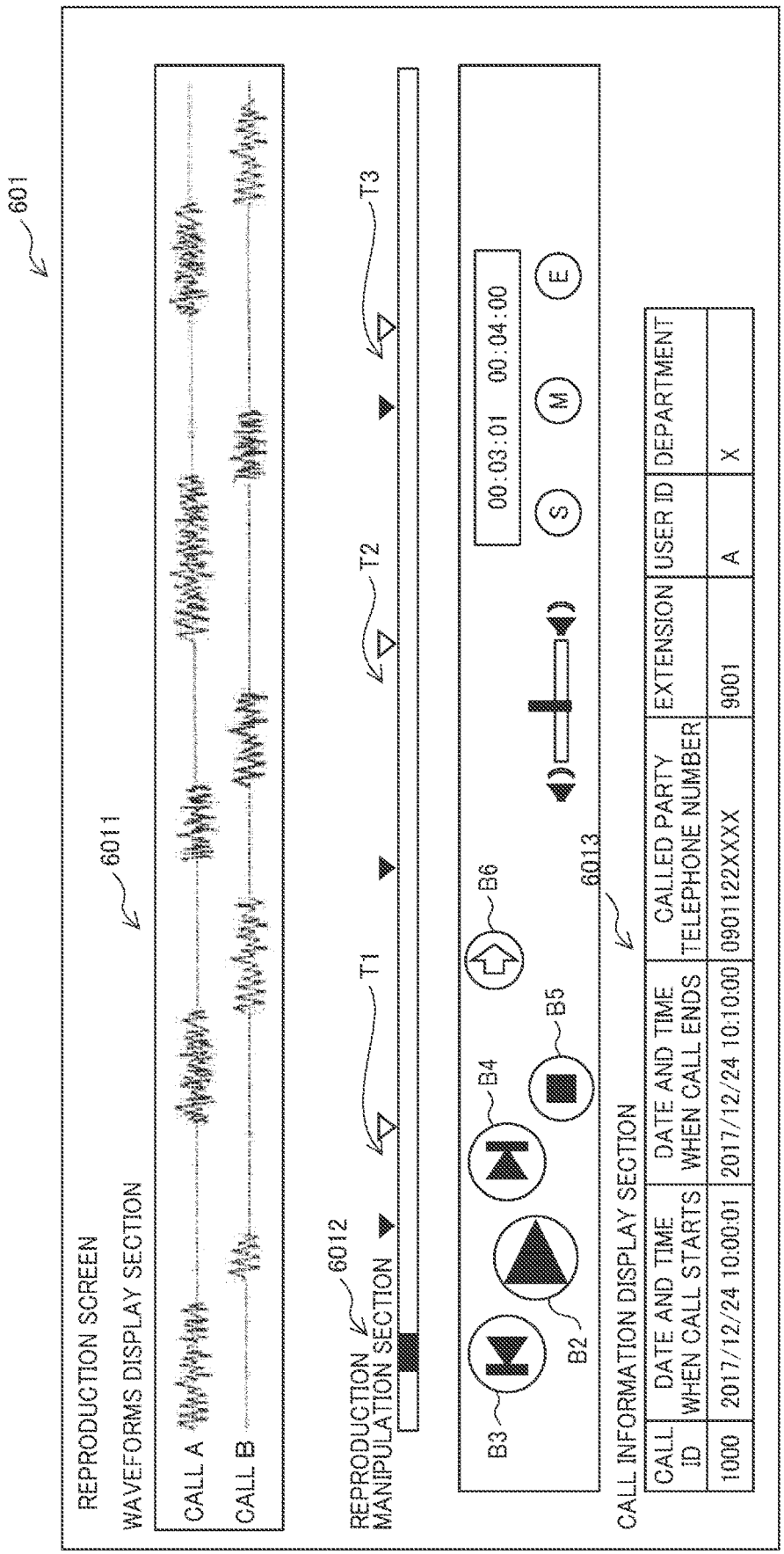
FIG. 6 is a view exemplifying the call information reproduction screen displayed on the operator's terminal.

FIG. 6 is a view exemplifying the call information reproduction screen displayed on the operator terminal. As illustrated in FIG. 6, a waveforms display section 6011 to display the waveforms of the voice data displayed upon the recorded file in which the call information is recorded being reproduced, a reproduction manipulation section 6012 to manipulate the reproduction of the recorded file, and a call information display section 6013 to display the call information from which the recorded file is originated are displayed in the call information reproduction screen 601. Further, sections T considered unnecessary for reproduction (three sections from T1 to T3 according to the illustration of FIG. 6), a start position (a triangle mark in black) and an end position (a triangle mark in white) of the sections T respectively are displayed in the reproduction manipulation section 6012. Further, a reproduction button B2 to reproduce the recorded file, a return button B3 to make the recorded file return to its start position, an advance button B4 to make the recorded file advance to its end position, a halt button B5 to halt the reproduction of the recorded file, and a skip button B6 to skip the reproduction of the sections are displayed in the reproduction manipulation section 6012.

It is illustrated in FIG. 6 that the call identified with the call ID '1000' is being reproduced. The operator terminal 500, upon receiving the push-down action of the above respective buttons from an operator or administrator, executes the operations corresponding to the buttons. For instance, upon the operator terminal 500 receiving the push-down action of the skip button B6, it reads the time of the day included in the terminal operation information when the terminal is operated so as to be put into 'Hold' and the time of the day included therein when the terminal is subsequently operated using the call ID of the call subjected to the push-down action through the skip button B6 as the key and with reference to the call information table 4031, the recorded information table 4032, and the terminal operation information table 4033. The operator terminal 500 calculates the time to be skipped during which the terminal is being operated or put into 'Hold' by computing the difference between such times of the day. Then, the operator terminal 500 reproduces the call during the calculated time to be skipped by skipping the sections of the call (e.g. hold sounds).

According to the present example, the operator terminal 500 automatically skips the sections of the call during the above time to be skipped, but it may be arranged such that whether or not the sections of the call are automatically skipped is selected through the call information reproduction screen. For example, upon the operator terminal 500 receiving the push-down actions twice (double click) through the skip button B6, it may reproduce the call without skipping such sections even during the above time to be skipped. In this way, by a user selecting whether or not the sections of the call which are unnecessary for reproduction is skipped, it allows the call to be reproduced according to the needs of such user.

FIG. 7 is a sequence diagram exemplifying the operations of the present system during recording. With reference to the sequence diagram illustrated in FIG. 7, explanation of the operations of the present system during recording is given sequentially from when an operator receives the call from a customer. These operations include the operator terminal being put into hold, the operator terminal being operated transferring the call to another operator when the other operator terminal is put into hold, wherein the call and recording of the operator A before the call being transferred to the other operator are represented as e.g. Call A and Recording A, respectively, while the call and recording of the operator B after the call being transferred are represented as e.g. Call B and Recording B, respectively, or the terminal operations related to such calls are represented as e.g. Call Reception A, Call Reception B, Hold A and Hold B.

As illustrated in FIG. 7, upon the operator terminal 500A receiving a telephone call from a customer's terminal T (S701), the CTI server 200 receives the call of the telephone call from the IP-PBX device 100 (S702) so as to transmit the call information of such telephone call to the recorded call information management device 400 (S703).

At the recorded call information management device 400, the call information entry unit 401 reads the terminal operation information included in the call information received from the CTI server 200 so as to enter such terminal operation information as the call ID '1000' into the terminal operation information table 4033 (see the illustration of FIG. 4) (S704) as well as enters the call information as the call ID '1000' into the call information table 4031 (see the illustration of FIG. 2) (S705). As regards the respective operations from S702 to S705, the call ID 1000 is entered for the respective terminal operations or hold, resume, transfer and disconnect as to the call A as well.

Thereafter, upon the call being transferred from the operator terminal 500A to the operator terminal B, as mentioned above, the terminal operation information is entered into the terminal operation information table 4033 (S706, S707, S708). Further, upon the operator terminal B receiving a call from the operator terminal 500A through the above transfer operation (S709), in the same way as the call A, the terminal operation information included in the call information and the call information is entered as the call B (or call ID '1001') into the terminal operation information table 4033 and the call information table 4031 respectively at (S710 to S713).

Upon the call between the operator terminal 500A and the operator terminal 500B being disconnected, the call between the customer's terminal T and the operator terminal 500A is resumed (S714) and the terminal operation information and the call information are entered as the call A (or call ID '1000') in the same way as the respective operations from S702 to S705 (S714 to S716).

Upon the call between the customer's terminal T and the operator terminal 500A being over, the call recording device 300 enters the recorded information including the recorded files which the recorded information entry unit 402 has received from the call recording device 300 into the recorded information table 4032 (see the illustration of FIG. 3) (S717 and S718).

In this way, through the sequential operations of the present system during recording illustrated in FIG. 7, the call information as to the call A and the call B, the recorded information and recorded files as to the call A and the call B as well as the terminal operation information as to the call A and the call B are entered into the call information table 4031, the recorded information table 4032 and the terminal operation information table 4033 respectively. Explanation is given as follows on the sequential operations of the present system during reproducing the call.

Figure 8:
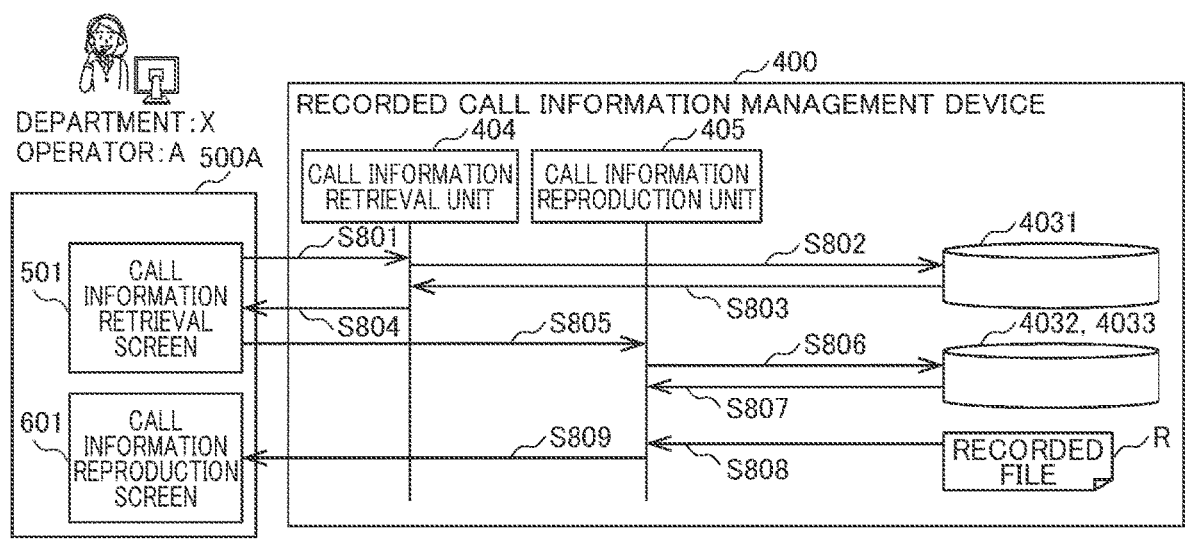
FIG. 8 is a sequence diagram exemplifying the operations of the present system upon reproduction.

FIG. 8 is a sequence diagram exemplifying the operations of the present system during reproduction. With reference to the diagram illustrated in FIG. 8, explanation is given on the case where the operator A operates the operator terminal 500A so as to reproduce the call identified with the call ID '1000'. Hereafter, it is supposed that the operator terminal 500A is in the state of displaying the call information retrieval screen 501 in response to the manipulation of the operator A.

To begin with, the operator terminal 500A receives the input of retrieval conditions such as extension number through the call information retrieval screen 501 from the operator A so as to transmit such retrieval conditions to the recorded call information management device 400 (S801). The call information retrieval unit 404 of the recorded call information management device 400 accesses the call information table 4031 using the retrieval conditions received from the operator terminal 500A as the key (S802); acquires call information corresponding to such retrieval conditions as a retrieval result (S803); and transmits such result to the operator terminal 500A (S804).

The operator terminal 500A displays the above acquired call information in the retrieval result 5015 on the call information retrieval screen 501 and receives the reproduction manipulation (e.g. push-down of the reproduction button) of the call identified with the call ID '1000' from the operator A. The operator terminal 500A transmits the reproduction request of the call A including such call ID to the recorded call information management device 400 (S805).

The call information reproduction unit 405 of the recorded call information management device 400 accesses the recorded information table 4032 and the terminal operation information table 4033 (S806) using the above call ID as the key; acquires the recorded information and the recorded files corresponding to the above call ID as a retrieval result (S807 and S808); and transmits such result to the operator terminal 500A (S809).

More specifically, the call information reproduction unit 405 acquires the stored destination of the recorded file corresponding to the call ID by retrieving the recorded information table 4032 using the selected call ID '1000' as the key and acquires the call information (call information on the call A) corresponding to the call ID by retrieving the call information table 4031 using the call ID as the key. Further, the call information reproduction section 405 accesses the terminal operation information table 4033 by using the selected call ID '1000' and the extension number '9001' corresponding to the call ID included in the acquired call information as the keys so as to acquire the terminal operation information of the call (terminal operation information of the call A).

Further, the call information reproduction unit 405, in order to acquire the call information after transfer, retrieves the call information including a called party telephone number corresponding to the extension number included in the acquired call information to acquire the call ID '1001' of the retrieved call information. The call information reproduction section 405, in the same way as in the case of the call ID '1000', acquires the stored destination of the recorded file corresponding to the call ID by retrieving the recorded information table 4032 using the call ID of the call information including the called party telephone number as the key and acquires the call information (call information on the call B) corresponding to the call ID by retrieving the call information table 4031 using the call ID of the call information including the called party telephone number. Further, the call information reproduction section 405 accesses the terminal operation information table 4033 by using the selected call ID '1001' and the extension number '9002' corresponding to the call ID of the call information including the called party telephone number as the keys so as to acquire the terminal operation information of the call (terminal operation information of the call B).

In this way, upon the call information, the recorded information, the terminal operation information and the recorded files respectively being acquired as to the call A before transfer and the call B after transfer, the operator terminal 500A displays the call information reproduction screen 601 based on such information and files. Hereupon, the call information reproduction section 405 generates waveforms data by e.g. analyzing the recorded file of the call A and the call B respectively so as to display such waveforms and reads the terminal operation information on the call A and the call B respectively so as to display the sections which are unnecessary for reproduction and call statuses indicated by the terminal operation information.

FIG. 9 is a view illustrating the detailed parts 900 of the call information reproduction screen 601 illustrated in FIG. 6, in which it should be noted the call information display section is omitted.

As illustrated in FIG. 9, according to this screen, the call information reproduction unit 405 displays a terminal operation information display section 9011, a call status display section 9012 of the operator A, a waveforms display section 9013 and a reproduction operation section 9014.

The terminal operation information display section 9011 is an area to display information obtained from the terminal operation information of the operator A which is acquired according to the above operations of the present system during reproduction. For instance, the call information reproduction unit 405 chronologically displays the times of the day when the terminal is operated and the details operated by the operator at such times of the day with reference to the terminal operation information table 4033.

The call status display section 9012 of the operator A is an area to display information on the call status of the operator A who is the subject of the call identified with the retrieved call ID. For instance, the call information reproduction unit 405 which refers to the terminal operation information table 4033 displays the call status saying 'chat with a customer' when the terminal operation information lie between 'start' and 'hold' while displaying the call status saying 'hold' when the terminal operation information lie between 'hold' and 'resume' on the terminal operation information display section 9011.

The waveforms display section 9013 is an area to display the waveforms data in which the voices of the acquired recorded files of the call A and the call B are expressed with waveforms. For example, the call information reproduction unit 405 displays the voice waveforms according to the call statuses of the operator A by e.g. reading and analyzing the terminal operation information and the called party telephone number with reference to the call information table 4031, the recorded information table 4032, and the terminal operation information table 4033.

The reproduction operation section 9014 is an area to display information on the time of the day when the section unnecessary for reproduction starts and the time of the day when such section ends as well as such section itself over the duration of such times of the day. For instance, the call information reproduction unit 405 which refers to the terminal operation information table 4033 recognizes it as 'hold' when the terminal operation information lie between 'hold' and 'resume' while recognizing it as 'transfer' when the terminal operation information lie between 'transfer' and 'resume' and determines that the duration of such 'hold' and 'transfer' respectively is not a part of the call on the part of the operator A. The call information reproduction unit 405 recognizes such sections (three sections T1 to T3 according to the illustration of FIG. 9) as those unnecessary for reproduction and displays a result on the recognized sections on the reproduction operation section 9014 in terms of the time of the day when such section starts and the time of the day when it ends and such section itself over the duration of such times of the day.

In this way, by the display of the call information reproduction screen 601 with its detailed parts 900 allows the operator or administrator to clearly recognize the sections unnecessary for reproduction. This dispenses with such wasteful operations conventionally performed as finding out such sections based on voice waveforms, which in turn allows the operability upon reproduction to shorten the time required for the operations of reproduction. Moreover, the push-down action of the skip button administered by the operator or administrator permits the call to be reproduced with ease, such that the operator or administrator can select, on his/her own accord, whether or not the call is to be skipped during such sections.

In other words, the call information entry unit 401 enters the operation information of the call terminals (customer's terminal T and operator terminals 500) obtained by the CTI server 200 into the terminal operation information table 4033; the recorded information entry unit 402 enters the recorded information of the call obtained by the call recording device 300 into the recorded information table 4032; the call information reproduction unit 405 recognizes the sections unnecessary for reproduction of the recorded information based on the operation information of the call terminals so as to display the call information reproduction screen 601 including a result on the recognized sections on the display device of the operator terminals 500, so that the operator or administrator can grasp correct sections unnecessary for reproduction at a glance, which dispenses with taking time and labor e.g. to find out such sections.

In addition, the call information reproduction unit 405 recognizes such sections based on hold operations and transfer operations included in the operation information of the call terminals so as to display the call information reproduction screen 601 including such sections, which allows such sections entailed with the hold and transfer operations to be grasped with ease.

Moreover, the call information reproduction unit 405 displays the button B6 to make the reproduction of the recorded information over such sections skipped on the call information reproduction screen 601 so as to enable an operator or administrator to select whether or not the reproduction over such sections is skipped, which allows the operator or administrator to reproduce the call over such sections where necessary.

Up to here, the preferred embodiment of the present invention has been described with reference to the accompanying drawings. However, the present invention is not limited to the above specific example, and may be modified into various manner without departing from the gist hereof.

By way of one example, it may be arranged such that the call information reproduction section 405 determines whether or not the number of hold operations and/or transfer operations and/or the time lapsed for such operations is higher than the predetermined threshold value (e.g. the number of the hold operations or transfer operations being two or more times or the time lapsed for such operations being three minutes or longer) through the call information reproduction screen illustrated in FIGS. 6 and 9; convincing itself 4033 that the time lapsed for such operations goes beyond the standard stand-by time allowable to a customer when determining that such lapse of time is longer than the predetermined threshold value so as to display alarm to that effect on the reproduction screen. By displaying such alarm thereon, it makes the operator or administrator pay due attention to how large the number of such hold or transfer operations or the time lapsed for such operations arisen during the call received by him/her is.

What is claimed is:

1. A call recording system comprising:
    call terminals operated during recording of calls;
    a call controller configured to perform call control for the terminals that acquires operation information of the call terminals for the calls being recorded;
    a call recorder that records the calls;
    a memory connected to the call controller and the call recorder configured to store operation information of the call terminals and to store recorded information of the calls; and
    a processor that is configured to
    store operation information of the call terminals which is acquired by the call controller into a terminal operation information table; of the memory;
    store recorded information of the calls which is acquired by the call recorder into a recorded information table of the memory,
    reproduce call information of the recorded calls and recognize sections unnecessary for reproduction of the recorded call information based on the stored operation information of the call terminals, and
    display on a reproduction screen of a display a result of the recognized sections.

2. The call recording system according to claim 1, wherein the processor is further configured to
    recognize the sections unnecessary for reproduction based on hold operations and transfer operations included in the operation information of the call terminals, and
    display on the reproduction screen the sections unnecessary for reproduction.

3. The call recording system according to claim 1, wherein the processor is further configured to display a selection button selected by a user on the reproduction screen indicating whether or not the sections unnecessary for reproduction are skipped on the reproduction screen.

4. The call recording system according to claim 2, wherein the processor is further configured to
display an alarm on the reproduction screen when the number of the hold operations and/or the transfer operations and/or time lapsed for the operations is larger than a predetermined threshold value.

5. A method of reproducing a recorded call in a call recording system having call terminals operated during recording of calls, a call controller performing call control for the terminals that acquires operation information of the call terminals for the calls being recorded, a call recorder that records the calls and a memory connected to the call controller and the call recorder comprising the steps of:
entering operation information of call terminals which is acquired by the call controller into a terminal operation information table of the memory;
entering recorded information of the calls obtained by the call recorder into a recorded information table of the memory; and
recognizing sections unnecessary for reproduction of the recorded information based on the operation information of the call terminals to display on a reproduction screen of a display a result of the recognized sections.

6. The method of reproducing a recorded call according to claim 5 wherein the recognizing of the sections unnecessary for reproduction is based on hold operations and transfer operations included in the operation information of the call terminals to display on the reproduction screen the sections unnecessary for reproduction.

7. The method of reproducing a recorded call according to claim 5 further comprising displaying a selection button selected by a user on the reproduction screen indicating whether or not the sections unnecessary for reproduction are skipped on the reproduction screen.

8. The method of reproducing a recorded call according to claim 6 further comprising displaying an alarm on the reproduction screen when the number of the hold operations and/or the transfer operations and/or time lapsed for the operations is larger than a predetermined threshold value.

* * * * *